Aug. 14, 1923.

H. C. WIERTH

BAKING PAN

Original Filed Nov. 22, 1920

1,464,792

INVENTOR
Harold C. Wierth
BY
ATTORNEY

Patented Aug. 14, 1923.

1,464,792

UNITED STATES PATENT OFFICE.

HAROLD C. WIERTH, OF BROOKLYN, NEW YORK.

BAKING PAN.

Application filed November 22, 1920, Serial No. 425,599. Renewed December 20, 1922.

*To all whom it may concern:*

Be it known that I, HAROLD C. WIERTH, a citizen of the United States, residing at New York city, borough of Brooklyn, in the county of Kings and State of New York, have invented a certain new and useful Baking Pan, of which the following is a specification.

This invention relates to baking pans and is more particularly adapted for employment in pans used for baking muffins, although it is not restricted to pans for this specific purpose.

The invention is, more particularly, an improvement on the construction described and claimed in my Patent No. 1,338,344, issued April 27th, 1920, wherein a muffin pan is shown having a plurality of depressions for the respective muffins and in each of which depressions is positioned a scraper. All of the scrapers are so operatively connected that they all may be rotated at once by a common operating member or prime mover.

The construction of my prior patent operates, in practice, with high efficiency, but is rather expensive to manufacture. Hence the primary object of the present invention is to so improve the pan of the prior invention that it may be manufactured at a lower cost and in a more expeditious and economical manner. Moreover, it is found, in practice, that the improved pan will give better results than the pan of my prior invention.

In carrying out the present invention, the scrapers are so mounted that they are fixed relative to the plate in which the muffin receiving cups are supported and these cups are mounted for rotation in the plate and are operatively connected together so that they may be simultaneously rotated from a common member or prime mover. This construction results in the simplification of parts and a more readily operation of the members for the purpose of dislodging the cooked muffins so that they may be conveniently removed from the pan.

Features of the invention, other than those specified, will be apparent from the hereinafter detailed description and claims, when read in conjunction with the accompanying drawings.

The accompanying drawings illustrate one practical embodiment of the present invention, but the construction therein shown is to be understood as illustrative, only, and not as defining the limits of the present invention.

Figure 1:
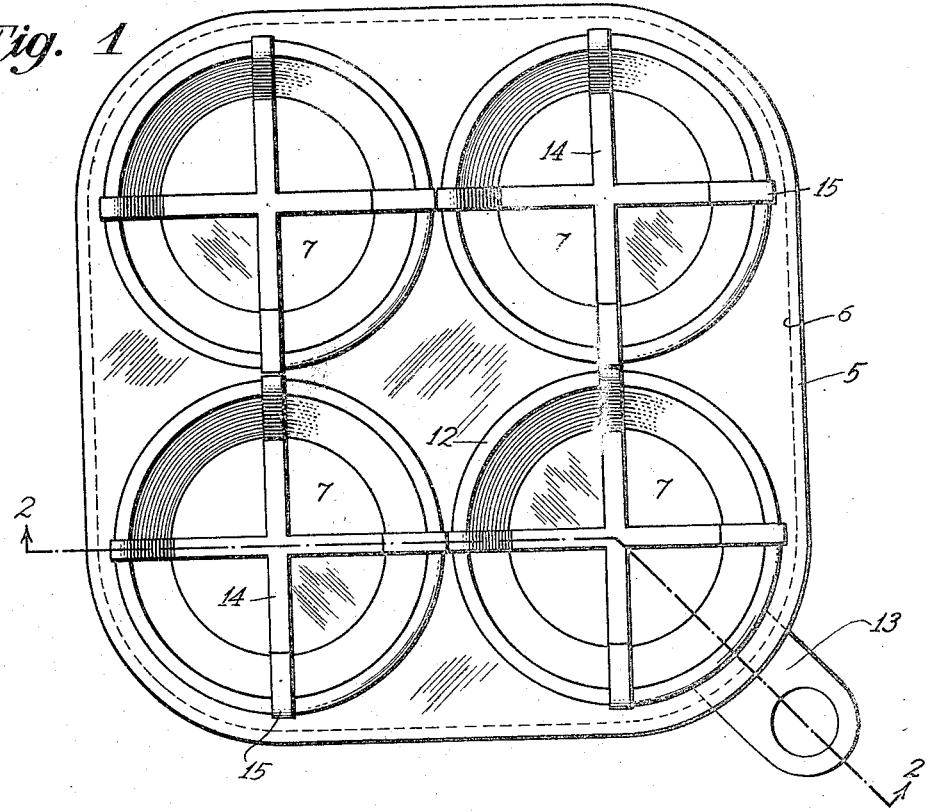
Figure 1 is a plan view of a muffin pan embodying the present invention.
Figure 2:
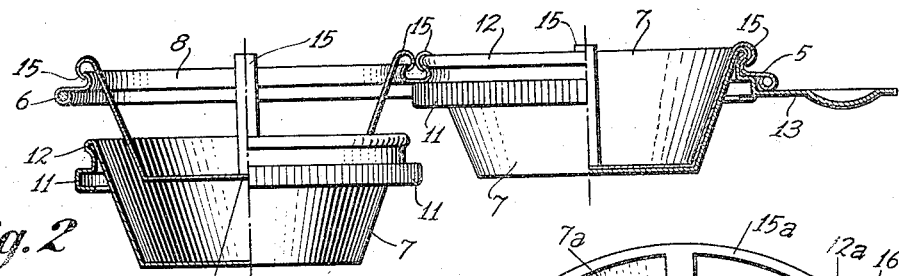
Figure 2 is a section on the broken line 2—2 of Figure 1, showing parts of each cup in section and other parts in elevation.
Figure 3:
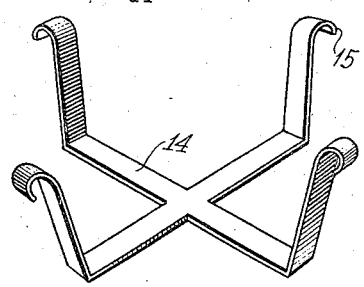
Figure 3 is a perspective view of one of the scrapers.

Referring to the drawings, and more particularly to Figures 1 to 3 inclusive, 5 designates a plate of sheet metal preferably tin or aluminum of any suitable shape adapted to form the body portion of the pan. The outer edge of this plate is rolled over as at 6 to give a finished edge and the body of the plate 5 is punched out at spaced intervals to provide openings adapted to cooperate with a corresponding number of cups 7 in which the muffins are adapted to be cooked.

The plate 5 is preferably formed by stamping up the same and about each cup opening is formed an upstanding flange 8 which is curved upwardly and outwardly, as best shown in Figure 2. A flange thus formed has a concave outer face and a convex inner face.

The cups 7 may be stamped up from sheet metal, the outer edge of the blank being bent outwardly and inwardly and terminating in a gear 11 which extends around the entire circumference of the cup intermediate its top and bottom. This formation of the cups moreover results in providing each cup with a beaded or thickened upper edge 12.

In assembling the pan, the cups 7 may be readily associated with the plate 5 by forcing the thickened or beaded upper edge 12 of each cup through one of the openings in the plate 5. The parts are so proportioned that the bead 12 of each cup requires forcing through the corresponding opening in the plate, but after such bead is passed through the opening the under face thereof seats against the convex surface of the co-operating flange 8, while the upper surface of the gear 11 seats against the under side of the plate 5, so as to hold the pan firmly in position and at the same time permit of rotation of the cup relative to the plate.

The position of the several cups on the plate 5 in the manner described automatically brings the gears 11 of adjacent cups into mesh, thereby connecting all of the cups together for simultaneous rotation which may be imparted thereto by rotating one of the cups through oscillation of a handle or finger piece 13 associated therewith. This finger piece may be formed integral with one cup and bent outwardly under the beads 6 of the plate 5, after the manner shown in Figure 2, wherein it will occupy an accessible position to be grasped and manipulated.

Positioned within each of the cups is a scraper 14 of the character shown in Figure 3. This scraper consists in a stamping embodying cross arms which are bent up to conform to the interior of the cups and is of substantially a spider shape. The end of each arm of the spider is curled over as at 15, so that when the spiders are dropped through the cup openings in the plate 5, the curls 15 may be sprung into engagement with the convex faces of the flanges 8, thereby serving to clamp the scrapers firmly and in proper position within the respective cups. The curls 15 of the scrapers may be soldered to the flanges 8 if desired.

If the finger piece 13 is now manipulated, all of the cups will be rotated simultaneously, while all of the scrapers will remain stationary and in this manner muffins may be readily dislodged from the respective cups and conveniently removed therefrom.

Figure 4:
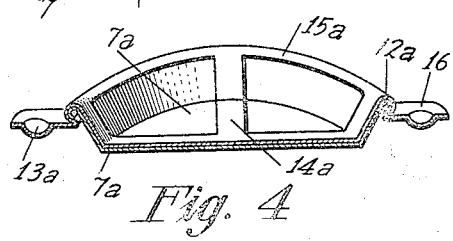
Figure 4 is a perspective section of a layer cake pan embodying the present invention.

It will be apparent from the foregoing description that the outer end of each arm of each spider is firmly anchored in position adjacent the outer periphery of the respective cups, and the spiders will tightly cling to the walls of the cup at all times, so that when the cups are rotated they will operate as scrapers to efficiently free the muffins from the cups. In the construction of Figures 1 to 4, the ends of the spiders are, in effect, curled over the beaded edges of the cups and are secured to the flanges 8. This is the construction which is preferable in a muffin pan, although I have shown in Figure 4 the general idea as applied to a layer cake pan wherein the plate 5 is omitted. In the construction of Figure 4, the pan 7ª is beaded over at its upper edge and at one point in its periphery the bead has formed integral therewith a finger piece 16 which is bent outwardly to extend in a lateral direction so that it may be readily grasped. The spider 14ª has the outer end of its arms connected by an annular ring 15ª which is curled over the bead 12ª of the pan and at one point in the circumference of the ring 15ª is formed a finger piece 13ª which is bent outwardly to extend in a lateral direction and into an accessible position.

The curling over of the spider ring 15ª is so accomplished as to permit of relative rotation between the spider and the pan 7ª, so that if the fingers 16 and 13ª are grasped, and rotation through 90 degrees or more imparted to the pan and spider, the cake within the pan 7ª may be efficiently scraped free from the pan.

It will be apparent from the foregoing description that the present invention is susceptible to modification in details of construction without departing from the spirit of the invention, the scope of which is commensurate with the appended claims.

Having thus fully described the invention, what I claim as new and desire to secure by Letters Patent is:

1. A baking pan embodying a plate provided with a plurality of apertures, cups mounted for rotation on the plate and registering with the respective apertures and operative connections between the cups whereby the rotation of one of them will result in the rotation of them all.

2. A baking pan embodying a plate provided with a plurality of apertures, cups mounted for rotation on the plate and registering with the respective apertures, operative connections between the cups whereby the rotation of one of them will result in the rotation of them all, and a scraper in each cup and mounted on the plate against rotation.

3. A baking pan embodying a plate provided with a plurality of apertures, an outwardly extending flange adjacent the margin of each aperture, a plurality of cups, the upper edge of each of which is provided with a bead adapted to engage with the inner face of the flange of the corresponding aperture in the plate and a gear carried by each cup and engaging with the under side of the plate, with the gears of adjacent cups meshing with one another, whereby the cups are mounted for rotation on the plate and are all rotated when one is rotated, and scrapers mounted on the plate against rotation and extending into the cups so that when the cups are rotated, the scrapers will traverse the interiors of the cups.

4. A baking pan embodying a plate provided with a plurality of apertures having marginal flanges, a plurality of cups, the upper edge of each of which is shaped to interlock with one of the flanges, whereby the cups may be mounted for rotation on the plate in registration with the openings therein, means for rotating the cups, and a scraper associated with each cup and maintained in position relative thereto by engagement with the flanges of the plates.

5. A baking pan embodying a plate provided with an opening and adjacent the margin of which opening said plate is further provided with an annular flange, a cup interfitting with said flange and mounted for rotation relative to the plate, and a scraper secured to the flange and projecting into the cup, and means for rotating the cup relative to the scraper and the plate.

6. A baking pan embodying a plate provided with an opening, a cup having interfitting relation with the plate adjacent the opening whereby the cup is mounted for rotation relative to the plate, and a scraper positioned within the cup and nonrotatably associated with the plate so that the scraper will remain stationary, while the cup is rotated.

7. A baking pan embodying a plurality of openings adjacent the margin of each of which is formed an upwardly and outwardly extending flange, a plurality of cups, each of which is provided at its top with a bead and intermediate its top and bottom with a gear, said cups being positioned on the plate so that the upwardly and outwardly extending flanges of the plate will lie intermediate the beads and gears of the respective cups, whereby the cups are mounted for rotation on the plate with the gears of the respective cups in mesh with one another, means for rotating the cups, and a scraper positioned in each cup and secured to the flange of the corresponding opening in the plate.

8. A baking pan of the character described embodying a plate provided with an aperture, a pan in register with said aperture and mounted for rotation relative to the plate and a scraper cooperating with the pan and supported against rotation by the plate.

9. A baking pan of the character described provided at its upper edge with a bead, a scraper positioned within the pan and having its outer periphery curled over the bead at the top of the pan to maintain the scraper within the pan to permit of relative rotation between the pan and scraper.

In testimony whereof, I have signed my name to this specification.

HAROLD C. WIERTH.